United States Patent [19]

Diersbock

[11] 3,824,781
[45] July 23, 1974

[54] HOROLOGICAL MOVEMENT EMPLOYING INDUCTIVE STEPPING MOTOR

[75] Inventor: Gunther Rudolph Diersbock, Watertown, Conn.

[73] Assignee: Timex Corporation, Waterbury, Conn.

[22] Filed: Mar. 14, 1973

[21] Appl. No.: 341,017

[52] U.S. Cl. .............................. 58/23 R, 310/261
[51] Int. Cl. .............................................. G04c 3/00
[58] Field of Search............ 58/23 R, 23 A; 310/261, 310/16

[56] References Cited
UNITED STATES PATENTS

| | | |
|---|---|---|
| 2,976,470 | 3/1961 | Krassoievitch et al............... 58/23 R |
| 2,986,684 | 5/1961 | Cluwen................................ 58/23 R |
| 3,125,696 | 3/1964 | Held..................................... 58/23 R |
| 3,541,778 | 11/1970 | Ingenito et al...................... 58/23 R |
| 3,690,058 | 9/1972 | Kurita.................................. 58/23 R |

Primary Examiner—Stephen J. Tomsky
Assistant Examiner—Edith Simmons Jackmon

[57] ABSTRACT

An electronic watch utilizes an alternating current unidirectional induction stepping motor for electromechanical conversion. The motor is driven step-wise by an oscillator, a frequency-reducing divide circuit and a polarity reversing driver circuit. The stepping motor includes a rotor having a multipole upper disk, a multishoe bottom disk, and an axially magnetized cylindrical magnet separating and magnetizing the two multishoe disk. The stator has pole portions cooperating with both upper and lower disks.

3 Claims, 4 Drawing Figures

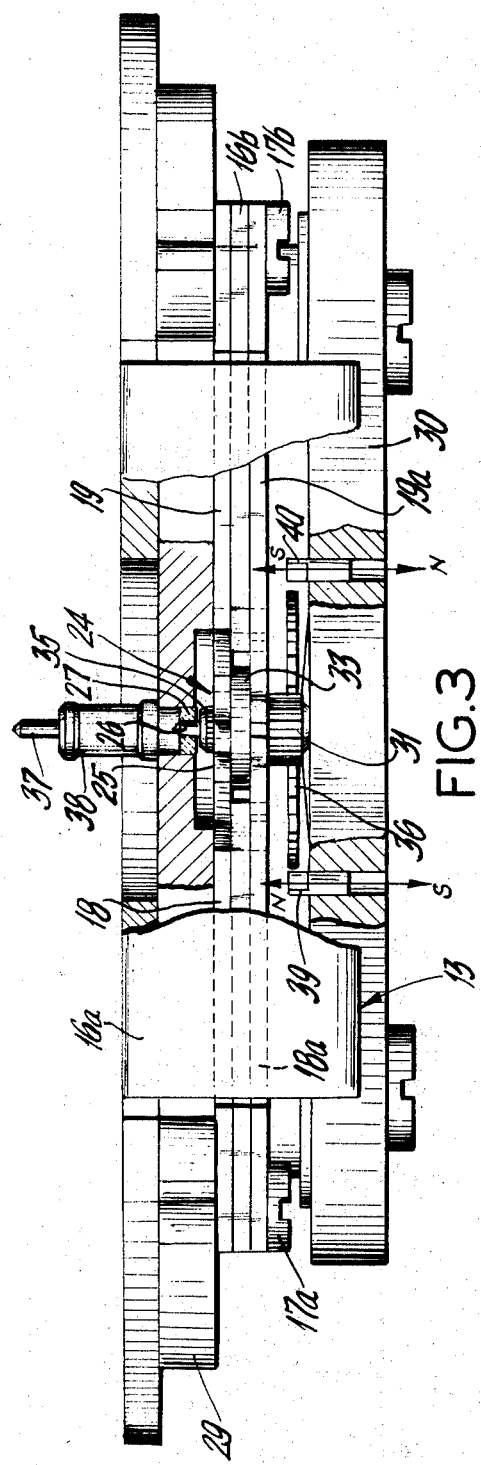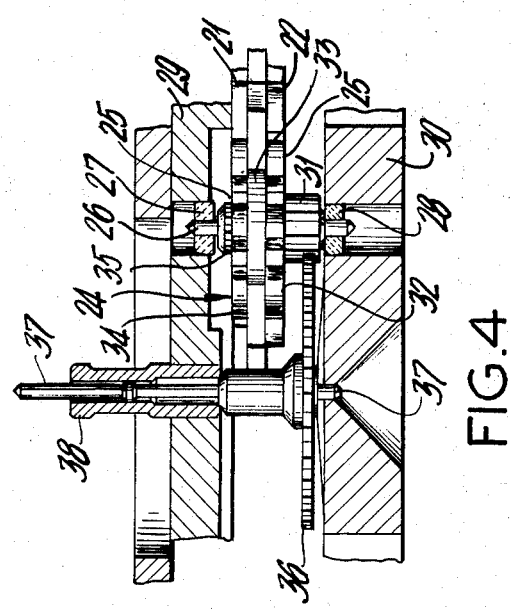

HOROLOGICAL MOVEMENT EMPLOYING INDUCTIVE STEPPING MOTOR

BACKGROUND OF THE INVENTION

The present invention relates to horology and more particularly to an electronic horological movement employing an inductive stepping motor for a watch.

At the present time, there are being manufactured various types of electric watches in which the motive power is supplied by a battery within the watch case. It has been suggested that a desirable horological movement would use either a mechanical or electronic oscillator as a time standard and use a stepping motor to drive the hands of the movement as its electromechanical converter. The stepping motor may be of the alternating current induction type in which currents in the rotor are created by induction, resulting from voltages induced in the rotor by changing the magnetic field of the stator. Some of these suggestions require stepping motors having pole pieces (pole shoes) which are alternatively magnetized, that is, a North magnetized pole shoe followed by a South magnetized pole shoe. However, such rotors may be relatively difficult to produce and may be relatively expensive.

Some of the other suggestions for stepping motors for use in electronic watches would be deficient because their power consumption would be too high, resulting in a too rapid drain of the battery, or their cost of production would be relatively high, or they would occupy too large a volume within the watch case.

SUMMARY OF THE INVENTION

In accordance with the present invention, a multishoe inductive stepping motor for an electronic watch is provided, which motor is relatively simple in construction so that it is relatively sturdy, relatively low in manufacturing cost, and accurate in operation. The electronic watch includes a time standard, which is preferably a quartz crystal oscillator, and a divide circuit to count down the relatively high frequency of the oscillator so as to provide low frequency pulses at its output. A driver circuit, which is preferably a polarity reversing circuit providing alternating polarity pulses, of the same low frequency at its output is connected to the divide circuit and, in turn, is connected to and controls a multipole inductive stepping motor. The stepping motor is driven unidirectionally and stepwise and is directly geared to a wheel of the dial train drive, which drives the rotatable hands of the watch, the hands providing the time display. The power for the oscillator, divide circuit, driver circuit and stepping motor is obtained from a small battery within the watch case.

The stepping motor consists generally of a rotor and a stator assembly. The stator assembly includes a driving coil which is connected to the driver circuit. The coil is wound around an arm of the magnetic circuit. The magnetic circuit includes the iron bar, about which the coil is wound, and two parallel plates extending from one end of the cylinder and two parallel plates extending from the opposite end of the cylinder. Each of the plates terminates in three pole pieces (pole shoes).

The rotor is mounted on a shaft which is freely rotatable in top and bottom bearings. A gear fixed to the shaft meshes with a gear of the dial train which rotates the hands of the watch. The rotor has first and second pole disks which are spaced apart by a cylindrical permanent magnet whose center is the axis of the rotor shaft. The magnet is magnetized in a North-South direction, so that the first disk is magnetized as the North magnetization and the second disk is magnetized as the South magnetization. The pole pieces (pole shoes) of the disks are identical the poles each having, in top view, a rounded outer edge, an indented portion which is at a slight angle relative to a radius through the center, and a second indented portion which is at a greater angle relative to a radius through the center.

It is an objective of the present invention to provide a multishoe inductive step motor for an electronic watch, which motor will be relatively simple in operation and relatively low in manufacturing cost.

It is a further objective of the present invention to provide such a step motor which will be relatively efficient in power consumption so as not to unduly drain the battery power source.

It is still a further objective of the present invention to provide such a step motor which will be relatively compact so as to provide adequate room within the watch case for the battery, electronic circuitry and gearing to drive the watch hands.

Accordingly, it is a feature of the present invention to provide an electronic horological movement including a base, and mounted thereon a set of terminals for a power source, an oscillator connected to the power source terminals to be the time standard of the movement, a count-down dividing circuit connected to the oscillator, a polarity reversal driving circuit providing alternating polarity pulses and connected to the power source terminals and to the dividing circuit, a time display, and a unidirectional induction motor connected to the power source and driving the time display. The motor has a stator and a rotor; the stator includes a coil wound around a portion of the stator, a first portion and a second portion, and an air gap between said first and second portions. The rotor is rotatably mounted on the base and within the air gap. The rotor includes a shaft, a first and second multishoe magnetizable disk fixed on said shaft, and a permanent magnet positioned between the multishoe disks.

It is a further feature of the present invention that the permanent magnet is a cylindrical disk axially magnetized in the axial direction of the shaft and that the first and second stator portions each comprises two parallel magnetizable plates.

BRIEF DESCRIPTION OF THE DRAWINGS

Other objectives of the present invention will become more fully apparent from the following description read in conjunction with the accompanying drawings which illustrate the preferred embodiment of the invention.

In the accompanying drawings:

FIG. 3 is a side plan view, partially in cross-section, of the stepping motor of the present invention, and FIG. 4 is a cross-sectional view, taken along the lines 4—4, of FIG. 2.

DESCRIPTION OF THE PREFERRED EMBODIMENTS

Figure 1:
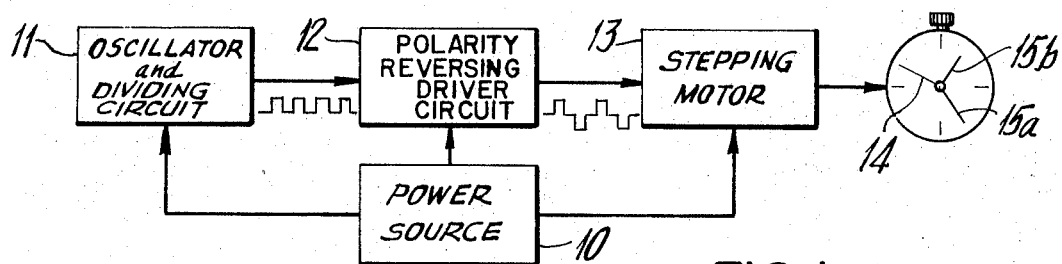
FIG. 1 is a block schematic diagram of the circuitry and mechanism of the watch of the present invention.

The internal mechanism of the electronic watch of the present invention is illustrated in FIG. 1. A direct current power source 10, which is preferably a small battery within the watch case, supplies the power fo the circuits of the watch and for the stepping motor. The time standard is preferably a quartz crystal oscillator, although alternatively other types of electronic oscillators or mechanical oscillators may be used as the time standard. The quartz crystal oscillator produces a high frequency, for example, over 32,000 Hz. The oscillator is connected to a dividing count-down circuit which reduces the high frequency of the oscillator to a lower frequency. The oscillator circuit and dividing circuit 11 may be formed as integrated circuits. The output of the dividing circuit 11 is to a driver circuit 12 which is a polarity reversing circuit. The driver circuit 12 receives a frequency from the divider circuit 11 and produces a reversal of polarity at that rate, that is, it output is pulses of alternative polarity.

The driver circuit may be any conventional bistable amplifier which changes the polarity of the output driving pulses after each input pulse. Although the type of driver circuit is not critical a suitable polarity reversing driver circuit is disclosed in my U.S. Pat. No. 3,766,729 issued Oct. 23, 1973 and assigned to the present assignee.

The driver circuit is connected to the stepping motor 13 which will be described in greater detail below. The stepping motor 13, driver circuit 12, oscillator and divider circuit 11 are connected to, and receive their power from, the power source 10. The stepping motor 13 is physically connected, by means of meshing gears, with the dial train of the watch. The dial train rotates the seconds hand 14, minute hand 15a and hour hand 15b of the watch, which is the time display of the watch. Other types of time displays, such as wheels having digital numbers thereon, may alternatively be employed.

Figure 2:
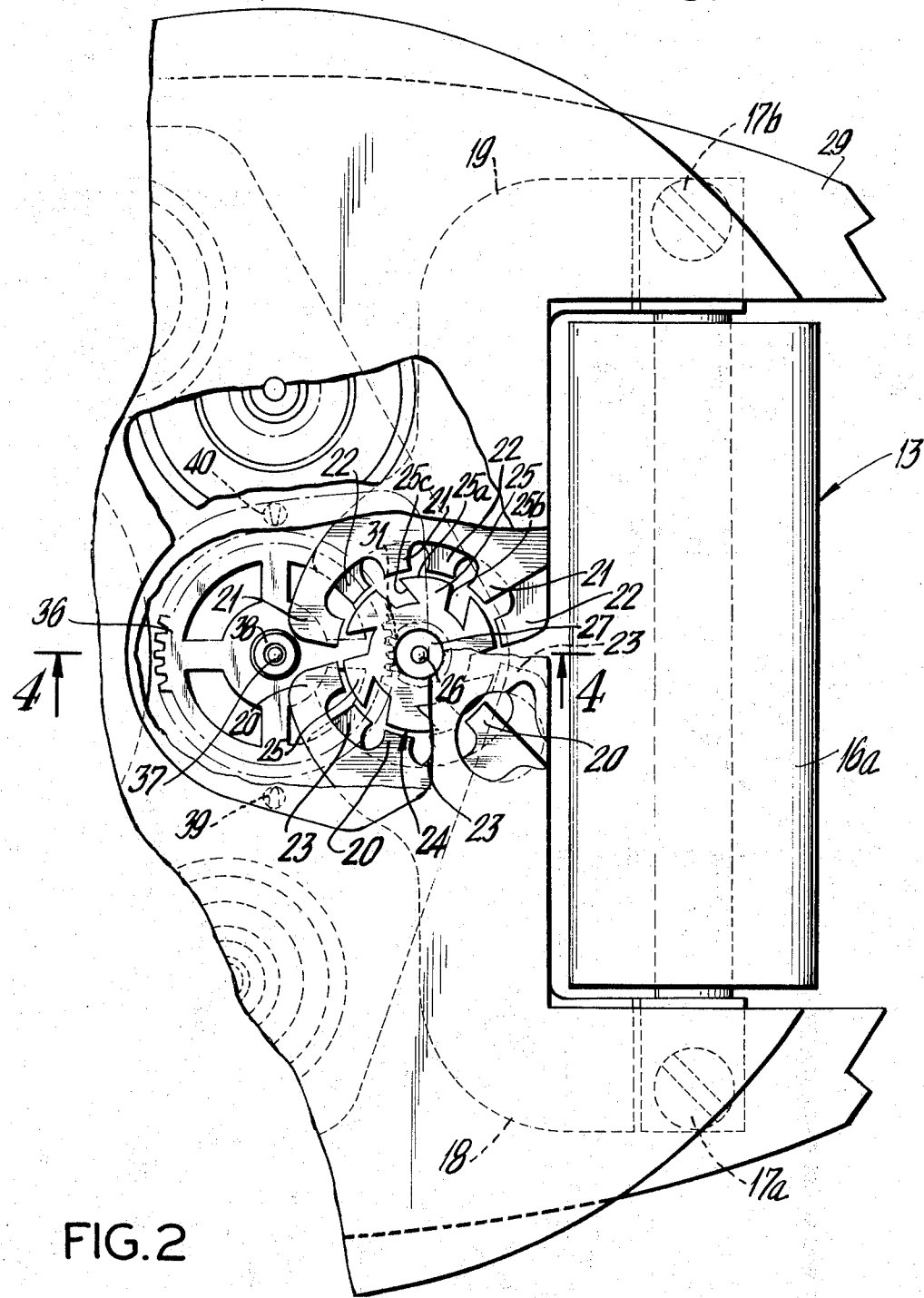
FIG. 2 is a top plan view of the stepping motor of the present invention.

As shown in FIGS. 2–4 the stepping motor 13 includes a driving coil 16a wound around a magnetically conductive elongated metal bar 16b. The coil 16a is wound of many turns of fine wire. The bar 16b is magnetically connected by respective screws 17a and 17b to a left top stator plate 18, a right top stator plate 19, a left bottom stator plate 18a, and right bottom stator plate 19a, as seen in FIG. 3. The top left stator plate 18 terminates in three top pole pieces (pole shoes) 20. Similarly, the right top stator plate 19 terminates in three pole pieces 21. The bottom right stator plates 19a terminates in three pole pieces 22 and the bottom left stator plate terminates in three pole pieces 23. The pole pieces of the bottom stator plates 18a and 19a are positioned in the gaps, as seen in the top view of FIG. 1, of the pole pieces of their top stator plates 18 and 19. As seen in FIG. 1, the top pole pieces 20 and bottom right pole pieces 22 are dymetrically opposed. In the same manner, the top right pole pieces 21 and the bottom left pole pieces 23 are diametrically opposed. The stator plates are flat and plates 18 and 18a are parallel to each other and plates 19 and 19a are parallel to each other. Plates 18 and 19 lie in the same plane as each other, and plates 18a and 19a lie in the same plane as each other.

As shown particularly in FIGS. 3 and 4, the rotor 24 includes a shaft 26 which freely rotates in a top jewel bearing 27 and in a bottom jewel bearing 28, the jewel bearings 27 and 28 being held, respectively, in holes within the top frame member 29 and the bottom frame member 30. A pinion gear 31 is fixed to the shaft 26. A first multishoe disk 32, a permanent magnet 33 and a second multishoe disk 34 are centered and fixed on the shaft 26, between the pinion gear 31 and a retainer 35. The multishoe disks 32 and 34 are of magnetizable material and each has six protruding shoes or pole pieces 25. Each of the pole pieces 25 is identical in shape and the pole pieces of the disks 32 and 34 are aligned, that is, the pole pieces of disk 32 are directly over and aligned with the pole pieces of disk 34. In side view, each pole piece is flat. In top view, as seen in FIG. 2, each pole piece 25 has a curved outer end 25a and a first side indentation 25b which is at a slightly diverging outward angle relative to a radius through the axis of the disk 34. Each pole piece 25 has a second side indentation 25c which is at a greater angle, but diverging inward, relative to a radius through the axis of disk 34.

The magnet 33 is a permanent magnet in the form of a cylindrical flat disk which is round, as seen in top view. It is magnetized axially, that is, in the direction of the axis of the shaft 26, so that its South pole is in contact with the top multishoe disk 34 and its North pole is in contact with the bottom multishoe disk 32.

The pinion gear 31 meshes with the sweep seconds wheel 36, which is fixed to the shaft 37. The shaft 37 is rotatable within the tube 38 and supports the seconds hand. The rotation of the shaft 37, by means of other gears (not shown) drives the shafts supporting the minutes hand and the hours hand. The entire set of gears which drives the hands is called the dial train drive.

The sweep seconds wheel 36 is indexed stepwise by means of the holding magnets 39 and 40 which are at opposite sides of the sweep seconds wheel 36. Preferably the portions of the magnets 39 and 40 which protrude above the frame plate 30 are somewhat triangularly shaped, in top view, so that their respective North and South magnetized faces will attract and hold the teeth of the second wheel 36. Preferably the seconds wheel has 60 teeth and is made of steel or other magnetic material, so that it may be held by the holding magnets 39 and 40. The stepwise motion of the seconds wheel 36 provides a sweep or "jump" seconds motion to the seconds hand. An alternative to the use of the holding magnets is to hold the sweep seconds wheel in its indexed position by a detent spring acting directly on that wheel or acting on a gear fixed to the same shaft.

In operation, the negative and positive pulses from the driver circuit 12 cause, by means of coil 16a, changes in the magnetic field of the stator's air gap within which the rotor is located. The alternating mutual attractions and repulsions of the magnetized rotor pole pieces with the magnetized stator pole pieces causes the rotor to rotate stepwise and unidirectionally.

It will be recognized that the invention, as described above, is of a preferred embodiment of the present invention and that the invention may be embodied in other specific forms without departing from its essential characteristics. The above described embodiment, consequently, is to be considered as illustrative and not restrictive, the scope of the invention being set forth by the following claims and their equivalents.

What is claimed to be secured by United States Letters Patent is:

1. An electronic horological movement including a base, and mounted thereon a set of terminals for a power source, an oscillator connected to the power source terminals to be the time standard of the movement, a count-down dividing circuit connected to said oscillator, a driving circuit connected to said count-down circuit, providing alternating polarity pulese and connected to the power source terminals, a time display, and a unidirectional induction stepping motor connected to the power source and the driving circuit for driving the time display, said motor having a stator and a rotor, said stator including a coil wound around a portion of the stator, a first portion and a second portion, said first and second portions each having spaced plates with a plurality of pole pieces, an air gap being formed between the ends of said first and second portions, said rotor being rotatably mounted on said base and within said air gap, said rotor including a shaft, a first and a second multishoe magnetizable disk fixed on said shaft, said disks aligned with said respective spaced plates, and a permanent magnet positioned between said multishoe disks.

2. A horological movement as in claim 1 wherein said driving circuit is a polarity reversal circuit connected to said count-down circuit arranged to provide low frequency alternating pulses to said stepping motor.

3. A horological movement as in claim 1 wherein said permanent magnet is a cylindrical disk axially magnetized in the axial direction of said shaft.

* * * * *